(12) United States Patent
Tomiyasu

(10) Patent No.: US 6,727,998 B1
(45) Date of Patent: Apr. 27, 2004

(54) PRINTING SYSTEM FOR TRANSMITTING PRINT DATA BY ELECTRONIC MAIL

(75) Inventor: Kunio Tomiyasu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/292,849

(22) Filed: Apr. 16, 1999

(30) Foreign Application Priority Data

Apr. 21, 1998 (JP) .......................................... 10-110926

(51) Int. Cl.⁷ .................... G06F 15/00; G06F 15/16; H04N 1/00; H04M 11/00
(52) U.S. Cl. ................... 358/1.15; 358/1.15; 358/402; 358/442; 709/202; 709/206; 379/100.7
(58) Field of Search .................. 358/400, 402, 358/408, 1.121, 407, 442, 434, 1.15, 447; 709/202, 206; 379/100.7

(56) References Cited

U.S. PATENT DOCUMENTS

| | | | | |
|---|---|---|---|---|
| 4,941,170 A | * | 7/1990 | Herbst ......................... | 379/100 |
| 5,812,278 A | * | 9/1998 | Toyoda et al. ............... | 358/402 |
| 5,958,005 A | * | 9/1999 | Thorne et al. ............... | 709/202 |
| 6,128,646 A | * | 10/2000 | Miloslavsky ................. | 709/206 |
| 6,181,440 B1 | * | 1/2001 | Masuda ....................... | 358/434 |
| 6,567,176 B1 | * | 5/2003 | Jeyachandran et al. .... | 358/1.14 |

* cited by examiner

Primary Examiner—Kimberly Williams
Assistant Examiner—Saeid Ebrahimi
(74) Attorney, Agent, or Firm—Oblon, Spivak, McClelland, Maier & Neustadt, P.C.

(57) ABSTRACT

A printing system can stably transmit print data by a simple operation without deterioration of an image quality. A first printer system is connected to a communication line, and transmits the print data by electronic mail through the communication line. The print data to be transmitted is converted into data described in a printer language by a printer driver provided in the first printer system. A second printer system is connected to the communication line, and receives the electronic mail via the communication line. The second printer system performs a printing operation based on the print data contained in the received electronic mail.

13 Claims, 7 Drawing Sheets

```
[PRIINT DATA]
[CATEGORY:RPDL]
[SOURCE FILE:LAYOUT.XLS]
[APPLICATION:MS Excel 95]
[DRV NAME:RICOH NX-110]
[DRV VERSION:V1.00]
[PLATFORM:Windows NT4.0]
[DATA TYPE:MIME]
[DATA START]
————— 75761504AF5

Content-Type: image/glf;name="LAYOUT.prn"
Content-Transfer-Encoding: base64
Content-Disposition: inlIne:filename="LAYOUT.prn"
          :    :    :    :    :

ROIGODlhgABVAOYAAM4hEMYhEMYYEL0hEM4hGLOYEM4YENYhELUYCL0hGLUYEP//lbOYCLUh
ELUhCL0hCNYpEKOYCMYYCMYhCKOYEMYAEMYQEM4YCMYIEM4pELOAEP//Kc5COaOhEKOhCKOh
ROIGODlhgABVAOYAAM4hEMYhEMYYEL0hEM4hGLOYEM4YENYhELUYCL0hGLUYEP//lbOYCLUh
ELUhCL0hCNYpEKOYCMYYCMYhCKOYEMYAEMYQEM4YCMYIEM4pELOAEP//Kc5COaOhEKOhCKOh WTKMIVVPV980dScShbABNnxytAOwWSre5Z9FhbSQLGatVyYDLXDNUT5PEbVJTbAdoAUW51LF
YQAcEuZgDglXAAJmTuZkXuYXIAESMAETcAFuvuZrLgEXUOdOLud2LgFonuZvjuZ2XueATuds
LuiAfgFgEAR1DgYX8AVBMASD3uiNrgJBwABRoAJRwABRoAJckOiSoAKdrg151AU5MOqjHggA
OwA=
              ————— 75761504AF5 —
```

PRINTING SYSTEM FOR TRANSMITTING PRINT DATA BY ELECTRONIC MAIL

BACKGROUND OF THE INVENTION

1. Field of the Invention

The present invention generally relates to a printing system and, more particularly, to a printing system in which print data is transmitted from a host computer to a remote printer via a communication line.

2. Description of the Related Art

Conventionally, there is a print system in which print data produced by a host computer is transmitted to a combination machine having both a facsimile function and a printing function via a telephone line, so that the print data is output from the combination machine. In such a case, a resolution of an image represented by the print data produced by the host computer may be different from a resolution of the facsimile part of the combination machine. When the resolutions are different from each other, the image output from the combination machine may be deteriorated.

Additionally, only limited types of combination machines can be used to print out the print data transmitted from the host computer. Further, in any cases, the operator must operate a modem, and management of telephone numbers is required.

Additionally, there is a method in which print data is distributed to a plurality of remote locations via electronic mail so that the print data is output from a printer provided in each of the remote locations. In such a case, the print data is prepared as a file having a printer data format and the print data file is attached to the electronic mail by a manual operation. That is, on the transmitter side, a file including the print data is prepared and is attached to the electronic mail provided with one or more mail addresses to which the print data should be sent. On the receiver side, the print data is extracted from the electric mail, and the extracted print data is transferred to a printer through an operation with a DOS prompt. If the above-mentioned operations are done manually, it is very inconvenient for the operator.

SUMMARY OF THE INVENTION

It is a general object of the present invention to provide an improved and useful printing system in which the above-mentioned problems are eliminated.

A more specific object of the present invention is to provide a printing system that can stably transmit print data by a simple operation without deterioration in an image quality.

In order to achieve the above-mentioned objects, there is provided according to one aspect of the present invention a printing system for printing an image based on print data, comprising:

a communication line a first printer system connected to the communication line, the first printer system transmitting the print data by electronic mail through the communication line; and a second printer system connected to the communication line, the second printer system receiving the electronic mail via the communication line, the second printer system performing a printing operation based on the print data contained in the received electronic mail.

According to the present invention, the print data produced by the first printer system is transmitted to the second printer system by the electronic mail, and the second printer system performs the printing operation based on the print data transmitted by the first printer system. Accordingly, the print data can be transmitted without being processed by a scanner as in the case of facsimile transmission. Thus, an image quality of the image produced by the print data is prevented from being deteriorated, resulting in high-quality printing.

Additionally, since the print data is transmitted via the electronic mail, a remote party receiving the print data can be specifically designated. This provides confidentiality to the transmission of the print data, and reduces a communication cost.

Additionally, since the print data to be transmitted is converted into code data prior to transmission and the original data is not transmitted to the remote party, there is no risk that the contents of the print data to be printed are changed before printing.

In the printing system according to the present invention, the first printer system may add discriminating information to the print data when the print data is contained in the electronic mail to be transmitted, the discriminating information being used for discriminating the print data from other data in the electronic mail. Additionally, the second printer system may discriminate the print data from other data contained in the received electronic mail in accordance with the discriminating information, and selects one of printers available in the second printer system so as to transfer the print data to the selected one of the printers.

Accordingly, since the discriminating information of the print data is added to the print data when the print data is transmitted by the electronic mail, the electronic mail containing the print data is positively distinguishable from regular electronic mail on the receiver side, and a printer appropriate for the print data is selectable based on the discriminating information.

In one embodiment of the present invention, the first printer system may include a first host apparatus connected to the communication line and producing the print data and at least one printer connected to the first host apparatus via a local communication line, and the second printer system may include a second host apparatus connected to the communication line so as to receive the electronic mail and at least one printer connected to the second host computer via a second local communication line.

Additionally, there is provided according to another aspect of the present invention a host apparatus adapted to be connected to another host apparatus via a communication line so that electronic mail is transmitted through the communication line, a printer driver being installed in the host apparatus so as to drive a printer connected to the host apparatus via a local communication line, the printer driver having a function to transmit the electronic mail containing print data.

The printer driver may comprise:

means for producing the print data described in a predetermined printer language;

means for preparing the electronic mail containing the print data and discriminating information indicating that the print data is contained in the electronic mail; and means for sending the electronic mail to the communication line.

Further, an operating system of the host apparatus may include mail utility software that comprises:

means for discriminating the print data from other data in the electronic mail in accordance with the discriminating information contained in the electronic mail, the discriminating information being added when the print data is attached to the electronic mail;

means for selecting a printer to which the print data is to be transferred, a selection being performed based on attribute information contained in the electronic mail, the attribute information being added when the print data is attached to the electronic mail; and means for transferring the print data to the selected printer.

Further, the mail utility software may further comprise means for indicating reception of the print data when the electronic mail containing the print data is received.

Additionally, there is provided according to another aspect of the present invention a processor readable medium storing the printer driver and the mail utility software so as to cause a computer to perform the printing operation according to the present invention.

Other objects, features and advantages of the present invention will become more apparent from the following detailed description when read in conjunction with the accompanying drawings.

DETAILED DESCRIPTION OF THE PREFERRED EMBODIMENTS

The printing system according to the present invention includes a plurality of printer systems each of which includes a host apparatus such as a host computer and a printing apparatus such as a printer. The printer systems are interconnected through the Internet. The host computer of each of the printer systems is provided with application software and mail utility software having a print-data discriminating function. The host computer is also provided with a mail transmitting function for transmitting print data by electric mail through the Internet.

In the printing system according to the present invention, a host computer of one of the printer systems can transmit print data produced by the host computer to a host computer of another one of the printer systems via the Internet in accordance with the mail transmitting function provided to the printer driver. The host computer (receiver side), which receives the print data via the Internet, discriminates the print data from other data in accordance with the print-data discriminating function provided in the mail utility software. The thus-discriminated print data is transferred to the printer on the receiver side.

Figure 1:
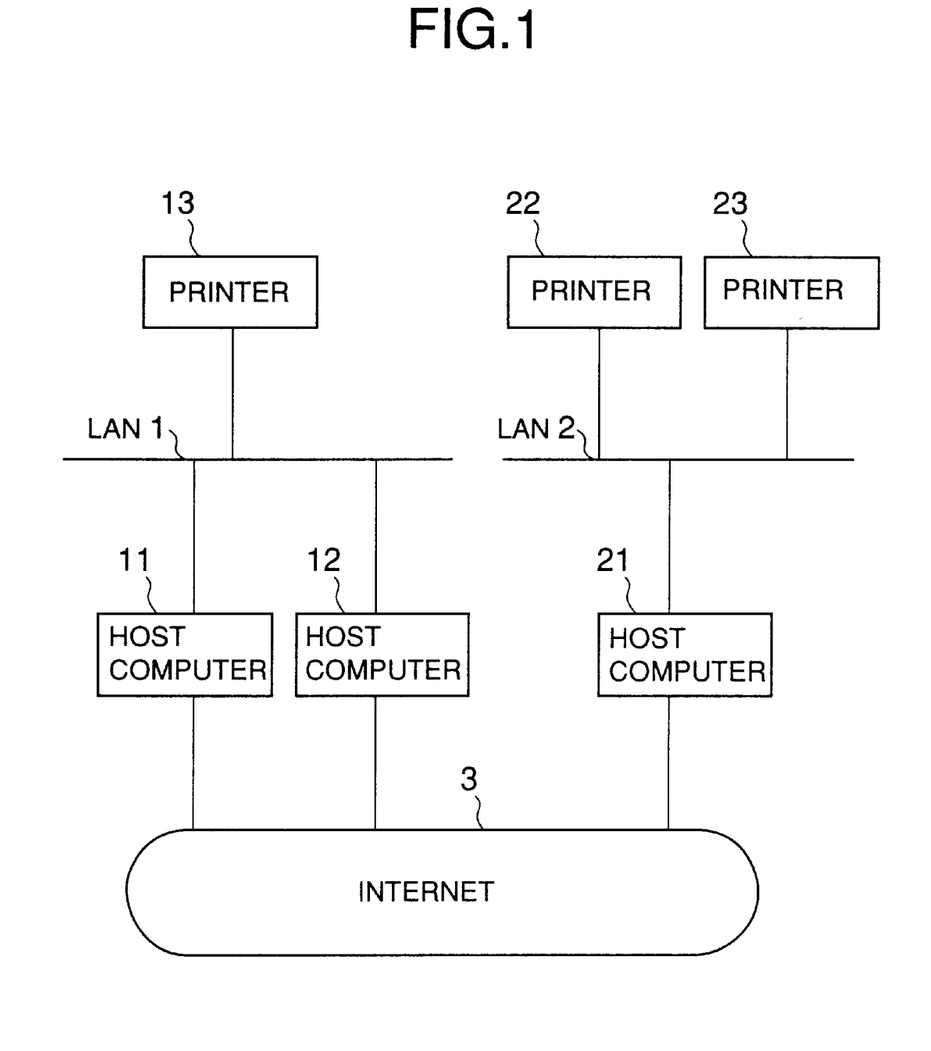
FIG. 1 is an illustration of a system network according to a first embodiment of the present invention.

FIG. 1 is an illustration of a system network according to a first embodiment of the present invention. As shown in FIG. 1, a local area network (LAN) 1 includes host computers 11 and 12 and a printer 13, and a local area network (LAN) 2 includes a host computer 21 and printers 22 and 23. The LAN 1 is connected to the Internet 3 via the host computers 11 and 12. The LAN 2 is connected to the Internet 3 via the host computer 21.

It should be noted that each of the host computers 11, 12 and 21 can be constituted by a conventional computer hardware structure, and a description thereof will be omitted. Additionally, each of the printers 13, 22 and 23 can be constituted by a conventional printer hardware structure, and a description thereof will be omitted.

Figure 2:
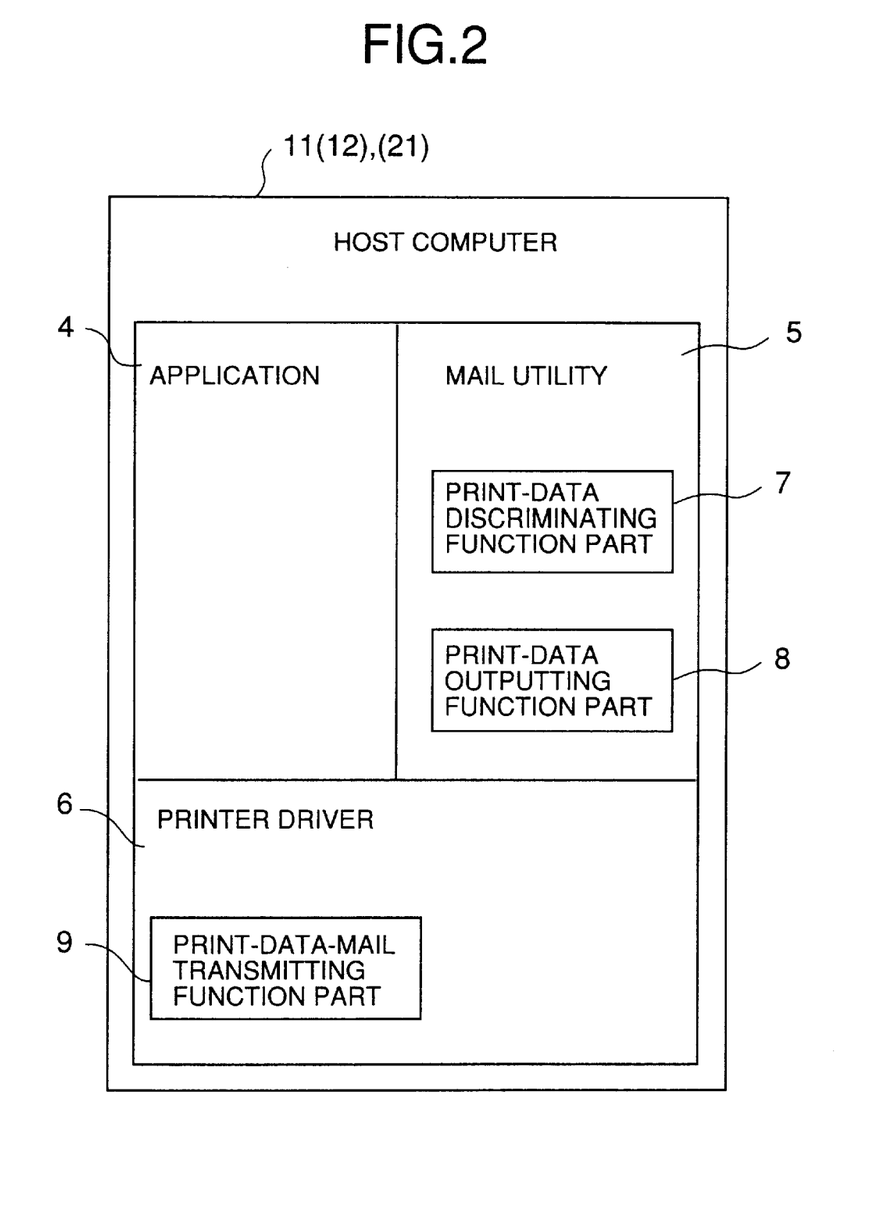
FIG. 2 is an illustration for explaining functions provided in each of host computers shown in FIG. 1.

FIG. 2 is an illustration for explaining functions provided in each of the host computers 11, 12 and 21 shown in FIG. 1. An operating system of each of the host computers 11, 12 and 21 includes, as shown in FIG. 2, application software 4, mail utility software 5 and a printer driver 6. The mail utility software 5 is provided with a print-data discriminating function part (program) 7 and a print-data outputting function part (program) 8. The printer driver 6 is provided with a print-data-mail transmitting function part (program) 9 which transmits print data to a designated address by electronic mail when such a designation is made. Hereinafter, this printing process is referred to as an electronic mail printing. The print-data discriminating function part 7 of the mail utility software provided to the host computer, which receives the electronic mail, determines whether or not the electronic mail contains the print data. If it is determined that the print data is contained in the electric mail, the host computer of the receiver side displays the fact that the print data is received, and sends an instruction for printing to the print-data outputting function part 8. The print-data outputting part 8 outputs the print data to a designated printer in accordance with an instruction for printing sent by a user or the print-data discriminating function part 7.

A description will now be given of an operation for printing the print data transmitted by an electronic mail. For example, the host computer 11 of the LAN 1 produces the print data and the print data is transmitted by electronic mail to the host computer 21 of the LAN 2 through the Internet 3, so that the printer 22 of the LAN 2 performs a printing operation based on the print data produced by the host computer 11 of the LAN 1.

Figure 3:
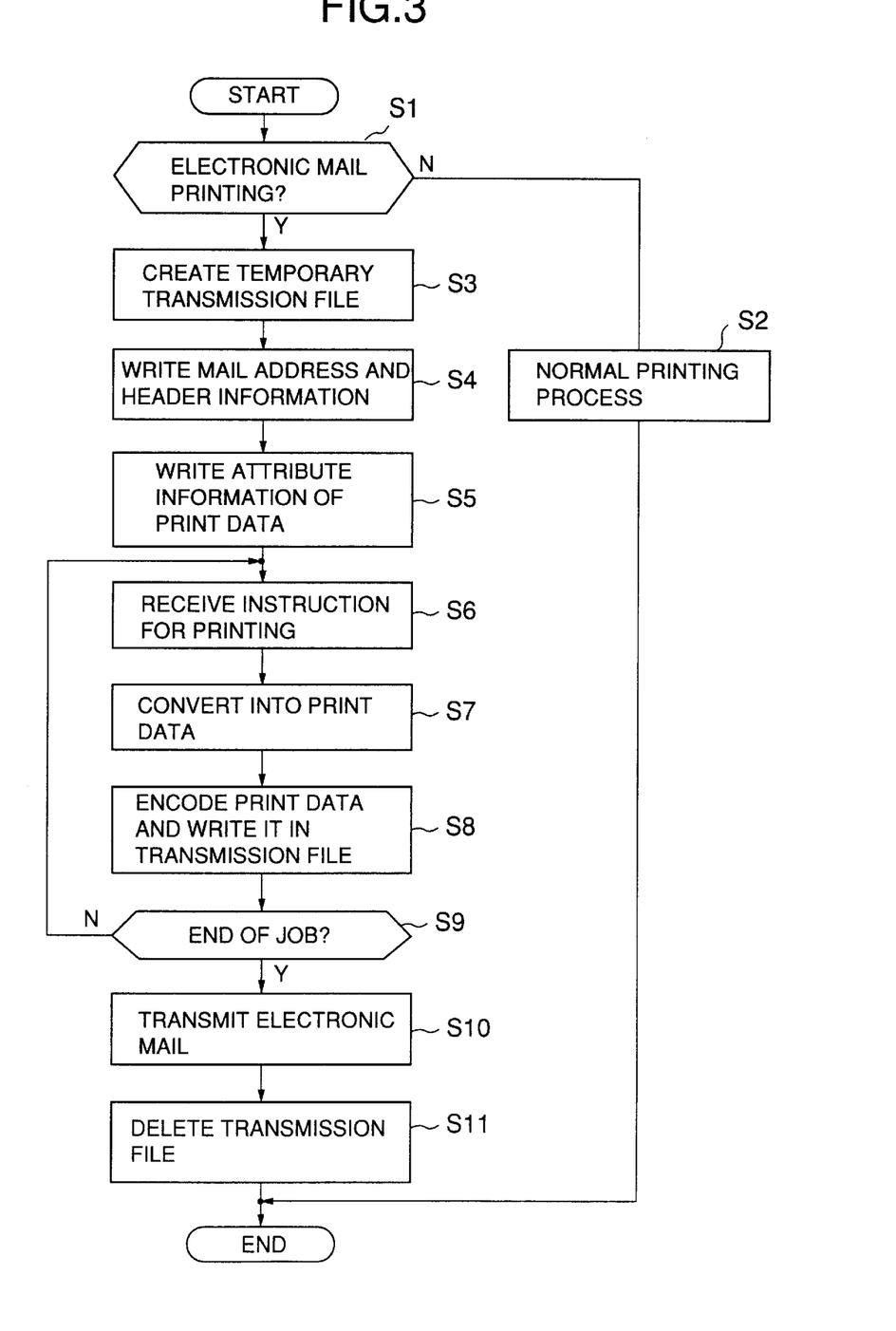
FIG. 3 is a flowchart of an operation performed by one of the host computers shown in FIG. 1 so as to produce and transmit print data to another host computer.

A description will now be given of an operation of the host computer 11 of the LAN 1 which is provided on the transmitter side. FIG. 3 is a flowchart of an operation performed by the host computer 11 so as to produce the print data and transmit the produced print data to the LAN 2.

When the operation shown in FIG. 3 is started, it is determined, in step S1, whether or not an electronic mail printing is requested. If the electronic mail printing is not requested, the routine proceeds to step S2 so as to perform a normal printing operation. In the normal printing operation, the printer driver 6 receives an instruction for the print data, and produces the print data which is appropriate for the printer to be used. In the present embodiment, the printer is used to output the print. Accordingly, the produced print data is transferred to the printer 13 so that the printer 13 outputs an image according to the print data. After the normal printing operation is completed, the routine is ended.

On the other hand, if it is determined, in step S1, that the electronic mail printing is requested, the routine proceeds to step S3. In step S3, the print-data-mail transmitting function part 9 of the printer driver 6 prepares a temporary transmission file. Then, in step S4, header information which is necessary for transmitting electronic mail is written in the temporary transmission file. The header information includes information regarding the host computer 21 to which the print data produced by the host computer 11 is to be transmitted. Thereafter, in step S5, attribute information of the print data is written in a data part of the temporary transmission file. The attribute information includes: a print-data discriminating code for indicating that the electronic mail is provided with print data; information regarding a type of print data such as a printer language; information regarding the name of the original file from which the print data is produced; information regarding the type and name of application software being used; the name of the printer driver; and the version information of the printer driver.

Thereafter, in step S6, the printer driver 6 receives an instruction for printing from the application software 4. In step S7, the printer driver 6 converts the data to be printed into print data so that the print data is described by a printer language such as a script code which can be applicable to the printer 22. Then, in step S8, the print data is encoded into code data such as mime-type data, and the encoded data is written in the temporary transmission file.

Figure 4:
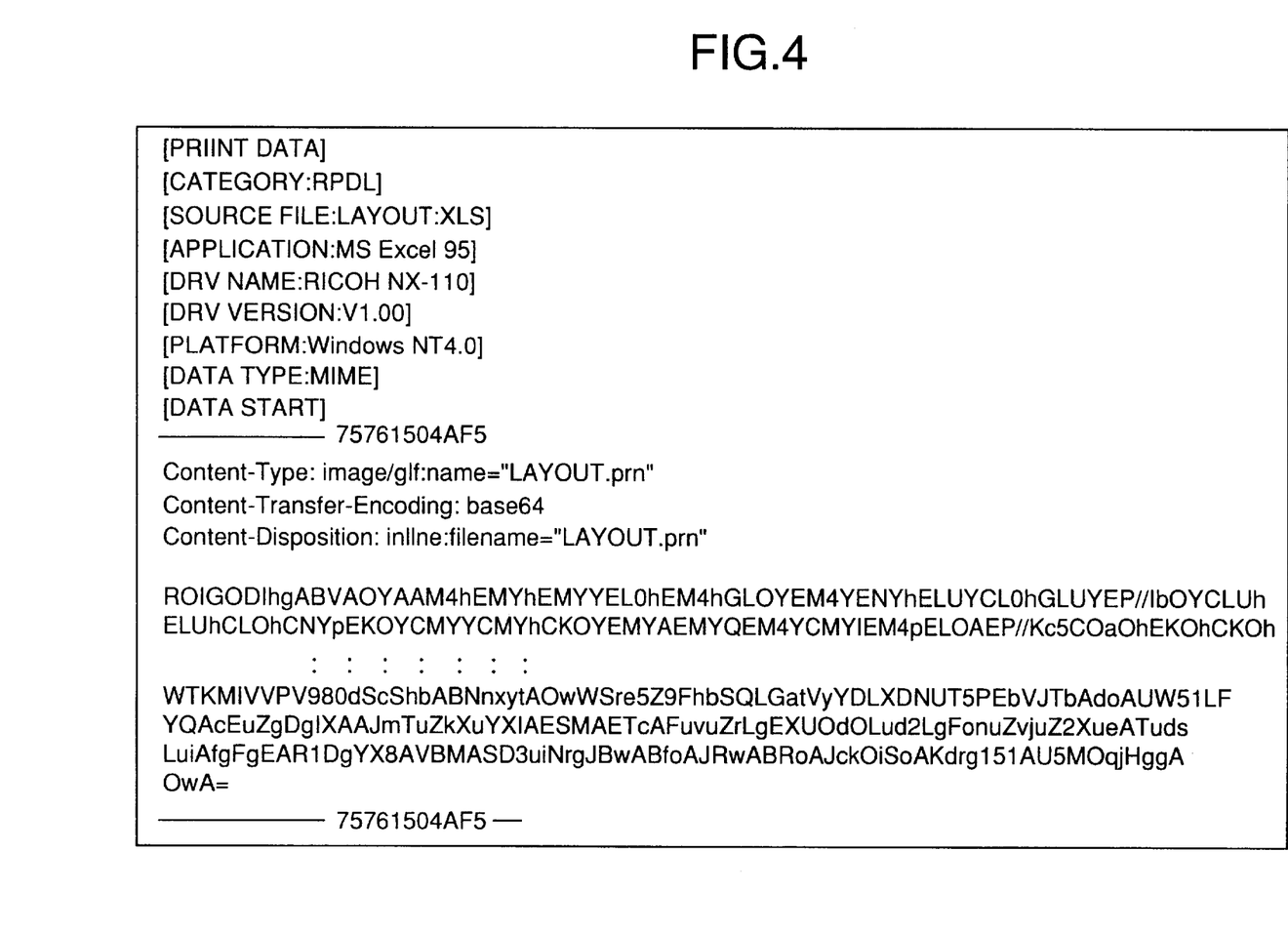
FIG. 4 is an illustration for explaining contents of electronic mail transmitted by one of the host computers shown in FIG. 1.

FIG. 4 shows an illustration for explaining the contents of the electronic mail including the thus-produced temporary transmission file. It should be noted that contents of a mail header of the electronic mail are not shown in FIG. 4 since the contents of the mail header are well-known in the art. In FIG. 4, the attribute information of the print data is written together with a keyword corresponding to each attribute data.

Referring to FIG. 3, after the process of step S8 is completed, it is determined, in step S9, whether or not the printing job is completed. If the printing job is not completed, the routine returns to step S6 so as to repeat the process of steps S6 to S9. If it is determined, in step S9, that the printing job is completed, the routine proceeds to step S10. In step S10, the electronic mail containing the encoded print data is transmitted to the host computer 21 via the Internet 3. Thereafter, the contents of the temporary transmission file in the host computer 11 are deleted, and the routine is ended.

Figure 5:
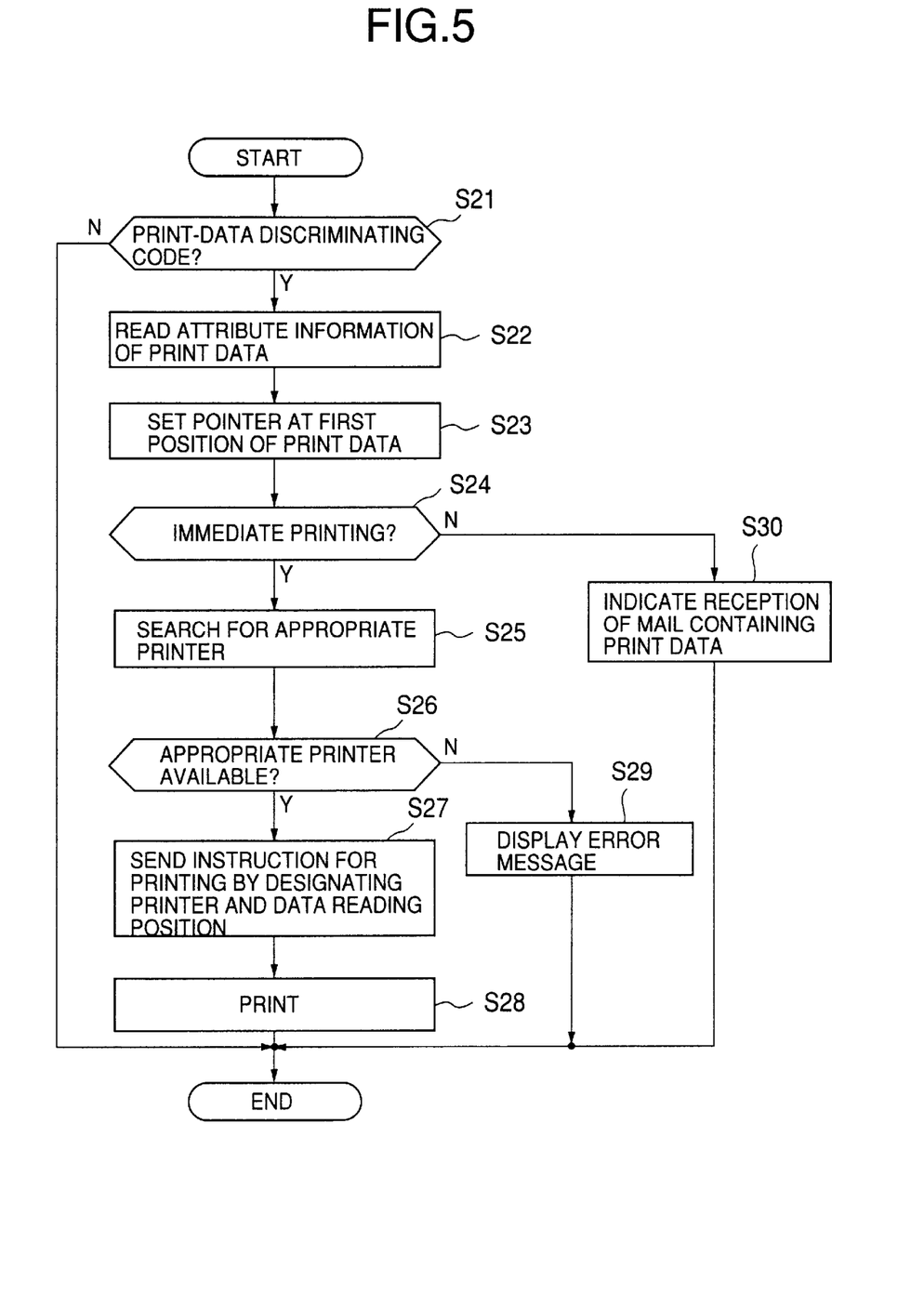
FIG. 5 is a flowchart of an operation performed by one of the host computers shown in FIG. 1 when the host computer receives electronic mail.

A description will now be given of an operation performed by the host computer 21 of the LAN2 which receives the electronic mail transmitted by the host computer 11 of the LAN 1. FIG. 5 is a flowchart of the operation performed by the host computer 21 when the host computer 21 receives the electronic mail transmitted by the host computer 11.

When the host computer 21 receives the electronic mail transmitted by the host computer 11, the print-data discriminating function part 7 of the host computer 21 determines, in step S21, whether or not print data is contained in the received electronic mail. The determination is made by checking whether or not the print-data discriminating code is provided at the first position of the data part proceeding the mail header. If it is determined that the electronic mail does not contain print data, the routine is ended. If it is determined that print data is contained in the received electronic mail, the routine proceeds to step S22. In step S22, the attribute data following the print-data discriminating code is read with reference to the keywords attached to the attribute data. Then, in step S23, a mail reading pointer is set to the first position of the print data so as to read the print data.

In step S24, it is determined whether or not a printing operation should be immediately started. If the printing operation should not be started immediately, the routine proceeds to step S30 so as to display the fact that the electronic mail containing the print data has been received. Such a notification is displayed on a display unit of the host computer 21 so that the user of the host computer 21 is notified of the reception of the electronic mail containing the print data.

If it is determined, in step S24, that the print data contained in the received electronic mail should be immediately output by a printer, the routine proceeds to step S25. In step 25, an appropriate printer is searched for in accordance with the attribute information and printer information regarding available printers. Then, in step S26, it is determined whether or not a printer that can handle the received print data is available. If a printer which can handle the received print data is not available, the routine proceeds to step 29 so as to issue an error message to be displayed on a display unit of the host computer 21, and the routine is ended. On the other hand, if it is determined, in step S26, that a printer appropriate for the printing operation based on the received print data is available, the routine proceeds to step S27. In step S27, an instruction for printing is sent to the print-data outputting function part 8 of the mail utility software 5. The instruction includes designation of the appropriate printer and information regarding a data reading position. In this embodiment, the printer 22 is selected as the printer appropriate for the print data. That is, the printer 22 can handle the print data written in the printer language used by the printer driver 6 of the host computer 11 that produced the print data. Thereafter, in step S28, the print-data outputting function part 8 sends the print data to the designated printer (the printer 22) so as to operate the printer 22 to print based on the received print data, and the routine is ended.

Figure 6:
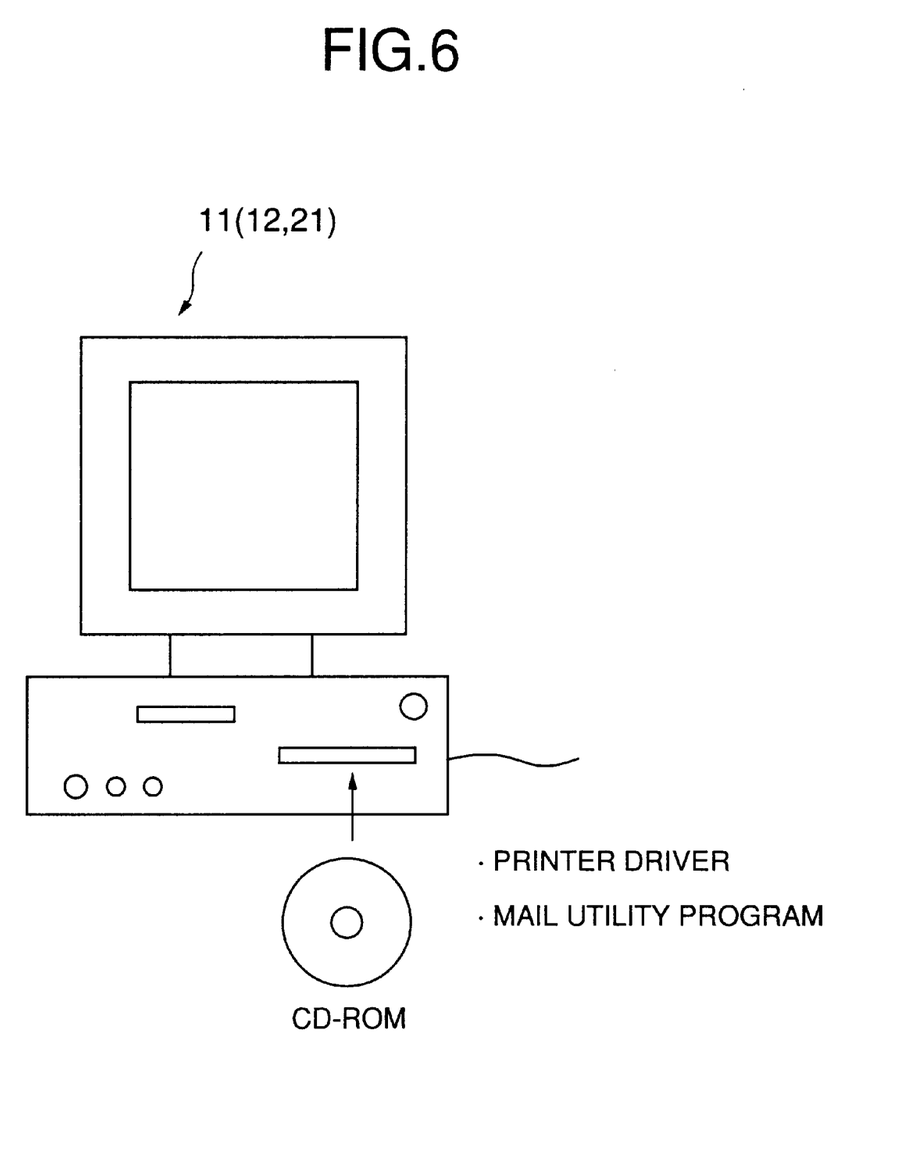
FIG. 6 is an illustration of a host computer and a CD-ROM storing a printer driver and mail utility software according to the first embodiment of the present invention.

In this embodiment, the mail utility software 5 and the printer driver 6 are installed in each of the host computers 11, 12 and 21. However, as shown in FIG. 6, the mail utility software 5 and the printer driver 6 may be provided as programs stored in a processor readable medium such as a CD-ROM.

As mentioned above, according to the present embodiment, the print data produced by the host computer 11 is transmitted to the host computer 21 by the electronic mail, and the host computer 21 transfers the received print data to the printer 22 which is provided on the receiver side. Accordingly, the print data can be transmitted without being processed by a scanner as is in a case of facsimile transmission. Thus, an image quality of the image produced by the print data is prevented from being deteriorated, resulting in high-quality printing.

Additionally, since the receiver can determine whether to print an image based on the print data according to the information transmitted together with the print data, an unnecessary printing operation can be prevented. Further, a printing operation based on the received print data can be performed many times until the received print data is deleted, and, thus, the print data can be printed out at a time it is desired.

Additionally, since the print data is transmitted via electronic mail, a remote party receiving the print data can be specifically designated. This provides confidentiality to the transmission of the print data, and reduces a communication cost.

Additionally, since the print data to be transmitted is converted into the code data prior to transmission and the original data is not transmitted to the remote party, there is no risk that the contents of the print data to be printed are changed before it is printed.

Additionally, since the discriminating information of the print data is added to the print data when the print data is transmitted by the electronic mail, the electronic mail containing the print data is positively distinguishable from a regular electronic mail and a printer appropriate for the print data is selectable based on the discriminating information.

Further, according to the present embodiment, the print data is discriminated from the received mail, and an appropriate printer is selected based on the discriminating information attached to the print data so that the received print data is transferred to the selected printer. Thus, discrimination of the print data, selection of an appropriate printer and transfer of the print data to the selected printer can be automatically performed, which results in reduction in a burden to a user.

Figure 7:
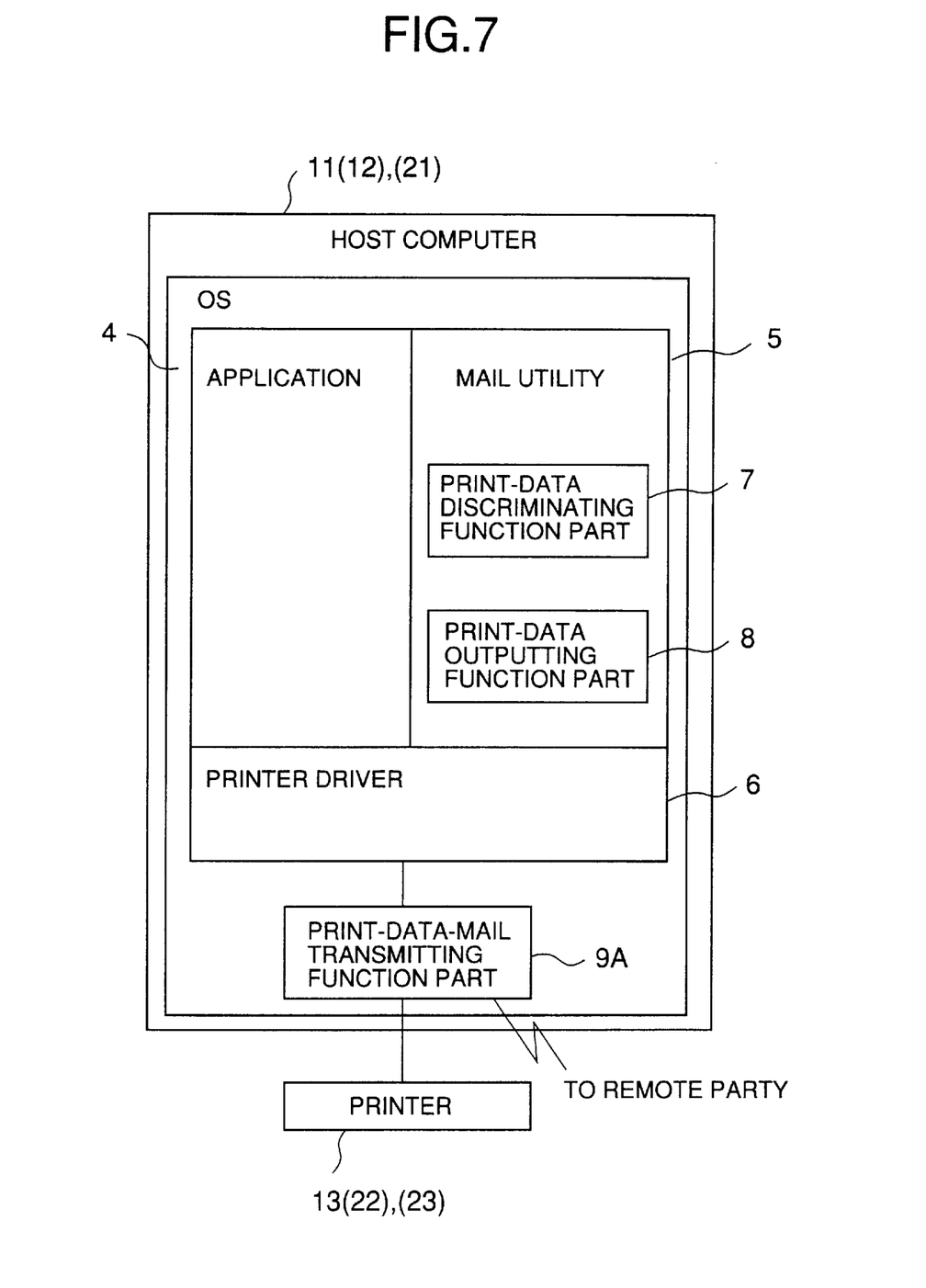
FIG. 7 is an illustration for explaining a variation of a print-data-mail transmitting function part shown in FIG. 2.

In the above-mentioned embodiment, the print-data-mail transmitting function part 9 is included in the printer driver 6. However, as shown in FIG. 7, instead of the print-data-mail transmitting function part 9, a print-data-mail transmitting function part 9A may be provided along a software path from the printer driver 6 to a data transmitting part outputting the print data to a local printer.

The print-data-mail transmitting part 9A determines whether or not the print data should be output to a local printer or a remote printer via electronic mail. If the print data output from the printer driver 6 should be output to the local printer, the print-data-mail transmitting function part 9A passes the print data through to the local printer. On the other hand, if the print data should be transmitted to the remote printer via electronic mail, the print-data-mail transmitting function part 9A prepares the electronic mail containing the print data and sends the electronic mail through the Internet 3.

When the print-data-mail transmitting function part 9A prepares the electronic mail, the discriminating information and the attribute information are added to the print data, as in the case of the print-data-mail transmitting function part 9. However, information regarding a type of print language, a name of a printer driver and a version of the printer driver, which correspond to [CATEGORY], [DRV NAME] and [DRV VERSION] shown in FIG. 4, is written in accordance with information regarding the printer driver being used and the printer to which the print data is directed.

In the case in which the print-data-mail transmitting function part 9 is included in the printer driver 6 as shown in FIG. 2, the information regarding [CATEGORY], [DRV NAME] and [DRV VERSION] may be fixed. However, according to the print-data-mail transmitting function part 9A shown in FIG. 7, a printer language and a printer driver can be selectively used by setting the information regarding [CATEGORY], [DRV NAME] and [DRV VERSION].

The present invention is not limited to the specifically disclosed embodiments, and variations and modifications may be made without departing from the scope of the present invention.

The present application is based on Japanese priority application No.10-110926 filed on Apr. 21, 1998, the entire contents of which are hereby incorporated by reference.

What is claimed is:

1. A printing system for printing an image based on print data, comprising:

a communication line;

a first printer system connected to said communication line, said first printer system transmitting the print data by electronic mail through said communication line; and a second printer system connected to said communication line, said second printer system receiving the electronic mail via said communication line, said second printer system performing a printing operation based on the print data contained in the received electronic mail, wherein the first and second printer systems each are provided with a printer driver configured to exchange the print data via the electronic mail.

2. The printing system as claimed in claim 1, wherein said first printer system adds discriminating information to the print data when the print data is contained in the electronic mail to be transmitted, the discriminating information being used for discriminating the print data from other data in the electronic mail.

3. The printing system as claimed in claim 2, wherein said second printer system discriminates the print data from other data contained in the received electronic mail in accordance with the discriminating information, and selects one of printers available in said second printer system so as to transfer the print data to the selected one of the printers.

4. The printing system as claimed in claim 1, wherein said first printer system includes a first host apparatus connected to said communication line and producing the print data and at least one printer connected to said first host apparatus via a local communication line, and said second printer system includes a second host apparatus connected to said communication line so as to receive the electronic mail and at least one printer connected to said second host apparatus via a second local communication line.

5. A host apparatus adapted to be connected to another host apparatus via a communication line so that electronic mail is transmitted through said communication line, a printer driver being installed in said host apparatus so as to drive a printer connected to said host apparatus via a local communication line, said printer driver having a function to transmit the electronic mail containing print data.

6. The host apparatus as claimed in claim 5, wherein the printer driver comprises:

means for producing the print data described in a predetermined printer language;

means for preparing the electronic mail containing the print data and discriminating information indicating that the print data is contained in the electronic mail; and means for sending the electronic mail to the communication line.

7. The host apparatus as claimed in claim 6, wherein an operating system of said host apparatus includes mail utility software, and said mail utility software comprises:

means for discriminating the print data from other data in the electronic mail in accordance with the discriminating information contained in the electronic mail, the discriminating information being added when the print data is attached to the electronic mail;

means for selecting a printer to which the print data is to be transferred, a selection being performed based on attribute information contained in the electronic mail, the attribute information being added when the print data is attached to the electronic mail; and means for transferring the print data to the selected printer.

8. The host apparatus as claimed in claim 7, wherein said mail utility software further comprising means for indicating reception of the print data when the electronic mail containing the print data is received.

9. A host apparatus adapted to be connected to another host apparatus via a communication line so as to receive electronic mail through said communication line, the electronic mail containing print data to be supplied to a printer for printing, said host apparatus comprising an operating system including mail utility software, wherein said mail utility software comprises means for discriminating the print data from other data in the electronic mail in accordance with discriminating information contained in the electronic mail, the discriminating information being added when the print data is attached to the electronic mail; means for selecting a printer to which the print data is to be transferred, a selection being performed based on attribute information contained in the electronic mail, the attribute information being added when the print data is attached to the electronic mail; and means for transferring the print data to the selected printer.

10. The host apparatus as claimed in claim 9, wherein said mail utility software further comprises means for indicating reception of the print data when the electronic mail containing the print data is received.

11. A processor readable medium storing a printer driver including program code for causing a computer to transmit electronic mail containing print data to be transferred to a printer for printing, comprising:

first program code means for producing the print data described in a predetermined printer language;

second program code means for preparing the electronic mail containing the print data and discriminating information indicating that the print data is contained in the electronic mail; and third program code means for sending the electronic mail to the communication line.

12. The processor readable medium as claimed in claim 11, further storing mail utility software including program code for causing the computer to transfer the print data contained in the electronic mail to the printer, said mail utility software comprising:

fourth program code means for discriminating the print data from other data in the received electronic mail in accordance with discriminating information contained in the electronic mail, the discriminating information being added when the print data is attached to the electronic mail;

fifth program code means for selecting a printer to which the print data is to be transferred, a selection being performed based on attribute information contained in the electronic mail, the attribute information being added when the print data is attached to the electronic mail; and sixth program code means for transferring the print data to the selected printer.

13. The processor readable medium as claimed in claim 12, wherein said mail utility software further comprises seventh program code means for indicating reception of the print data when the electronic mail containing the print data is received.

* * * * *